US006840613B2

(12) United States Patent
Jones

(10) Patent No.: US 6,840,613 B2

(45) Date of Patent: Jan. 11, 2005

(54) GUIDE FOR SOLID INK STICK FEED

(75) Inventor: Brent R. Jones, Tualatin, OR (US)

(73) Assignee: Xerox Corporation, Stamford, CT (US)

(*) Notice: Subject to any disclaimer, the term of this patent is extended or adjusted under 35 U.S.C. 154(b) by 148 days.

(21) Appl. No.: 10/135,077

(22) Filed: Apr. 29, 2002

(65) Prior Publication Data

US 2003/0202069 A1 Oct. 30, 2003

(51) Int. Cl.[7] .............................. B41J 2/175; B41J 2/17; G01D 11/00

(52) U.S. Cl. .............................. 347/88; 347/99; 347/84; 347/85; 347/95

(58) Field of Search .............................. 347/99, 88, 84, 347/85, 95

(56) References Cited

U.S. PATENT DOCUMENTS

| | | | | |
|---|---|---|---|---|
| 5,223,860 A | * | 6/1993 | Loofbourow et al. | 347/88 |
| 5,455,604 A | | 10/1995 | Adams et al. | 346/138 |
| 5,734,402 A | | 3/1998 | Rousseau et al. | 347/88 |
| 5,805,191 A | | 9/1998 | Jones et al. | 347/103 |
| 5,861,903 A | | 1/1999 | Crawford et al. | 347/88 |
| 6,053,608 A | | 4/2000 | Ishii et al. | 347/88 |
| 6,254,228 B1 | | 7/2001 | Sago | 347/88 |

FOREIGN PATENT DOCUMENTS

| | | |
|---|---|---|
| JP | 04093259 | 3/1992 |

OTHER PUBLICATIONS

Jones et al., "Guide for Solid Ink Stick Feed," U.S. Appl. No. 10/135,051 (Attorney Docket No. D/A1664), filed concurrently herewith.

Jones et al., "Guide for Solid Ink Stick Feed," U.S. Appl. No. 10/135,078 (Attorney Docket No. D/A1664Q), filed concurrently herewith.

* cited by examiner

*Primary Examiner*—Stephen D. Meier
*Assistant Examiner*—Leonard Liang
(74) *Attorney, Agent, or Firm*—David J. Arthur

(57) ABSTRACT

An ink stick for use in a solid ink feed system of a phase change ink jet printer includes an ink stick body that has a bottom surface and a lateral dimension. The ink stick body has a lateral center of gravity, and a guide element formed in the bottom surface of the ink stick body, which guide element is substantially vertically aligned with the lateral center of gravity of the body. The ink stick is used in a solid ink feed system for a phase change ink jet printer. The feed system includes a longitudinal feed channel, and a feed channel guide rail substantially centered in a lower portion of the feed channel. The guide element formed in the bottom surface of the ink stick body slidingly engages the central feed channel guide rail in the feed channel.

14 Claims, 8 Drawing Sheets

GUIDE FOR SOLID INK STICK FEED

CROSS-REFERENCE TO RELATED APPLICATIONS

Reference is made to commonly-assigned copending U.S. patent application Ser. No. 10/135,051, filed concurrently herewith, entitled "Guide For Solid Ink Stick Feed," by Jones et al., and U.S. patent application Ser. No. 10/135,078, filed concurrently herewith, entitled "Guide For Solid Ink Stick Feed," by Jones et al., the disclosures of which are incorporated herein.

The present invention relates generally to ink printers, the ink used in such ink printers, and the apparatus and method for feeding the ink into the printer.

BACKGROUND

Solid ink or phase change ink printers conventionally receive ink in a solid form, either as pellets or as ink sticks. A feed mechanism delivers the solid ink to a heater assembly, where the ink is melted into a liquid state for jetting onto a receiving medium.

Solid ink or phase change ink printers conventionally receive ink in a solid form and convert the ink to a liquid form for jetting onto a receiving medium. The printer receives the solid ink either as pellets or as ink sticks in a feed chute. With solid ink sticks, the solid ink sticks are either gravity fed or spring loaded through the feed channel toward a heater plate. The heater plate melts the solid ink into its liquid form. In a printer that receives solid ink sticks, the sticks are gravity fed or spring loaded along a feed channel and pressed against a heater plate to melt the solid ink into its liquid form. U.S. Pat. No. 5,734,402 for a Solid Ink Feed System, issued Mar. 31, 1998 to Rousseau et al.; and U.S. Pat. No. 5,861,903 for an Ink Feed System, issued Jan. 19, 1999 to Crawford et al. describe exemplary systems for delivering solid ink sticks into a phase change ink printer.

SUMMARY

A solid ink feed system for a phase change ink jet printer includes a longitudinal feed channel for receiving and staging solid ink sticks, a feed channel guide rail substantially centered in a lower portion of the feed channel, and an ink stick. The ink stick has a width substantially equal to the width of the feed channel, and a longitudinal guide element substantially centered in the bottom surface of the ink stick for engaging the feed channel guide rail. The width of the feed channel guide rail is substantially less than the width of the feed channel.

An ink stick for use in a solid ink system of a phase change ink jet printer includes an ink stick body that has a bottom surface and has at least two side surfaces, and a longitudinal guide element formed in the bottom surface of the ink stick body. Each of the two side surfaces intersect the bottom surface to form lateral edges, and the guide element is substantially centrally positioned between the lateral edges.

A method of loading an ink stick into a solid ink feed system of a phase change ink jet printer includes providing an ink stick, in which the ink stick includes a bottom surface, a lateral center of gravity, and a guide element in the bottom surface, substantially aligned with the lateral center of gravity. The method further includes aligning the guide element with the feed channel guide rail in the feed system, inserting the ink stick into the feed system, and resting the guide element on the feed channel guide rail so that contact between the guide element and the feed channel guide rail is substantially the only contact between the bottom surface of the ink stick and the feed system.

THE DRAWINGS

DETAILED DESCRIPTION

Figure 1:
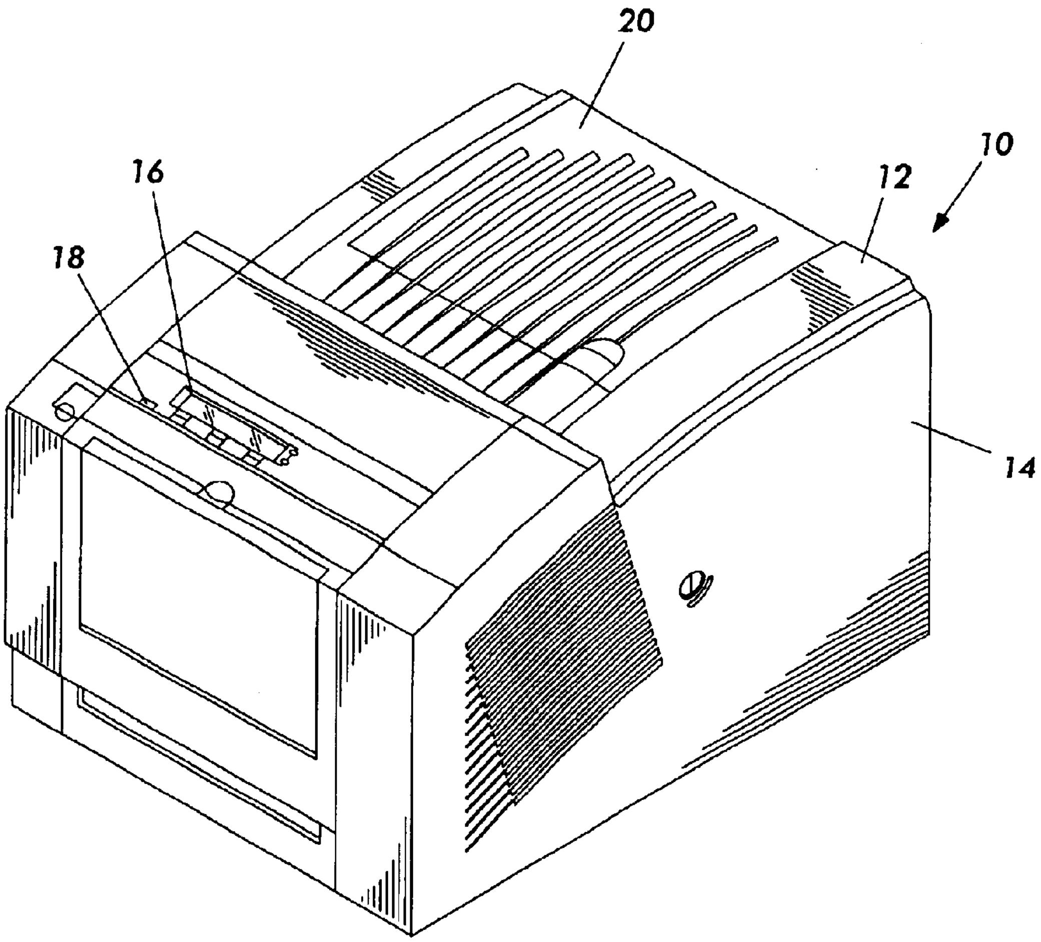
FIG. 1 is a perspective view of a phase change printer with the printer top cover closed.
Figure 2:
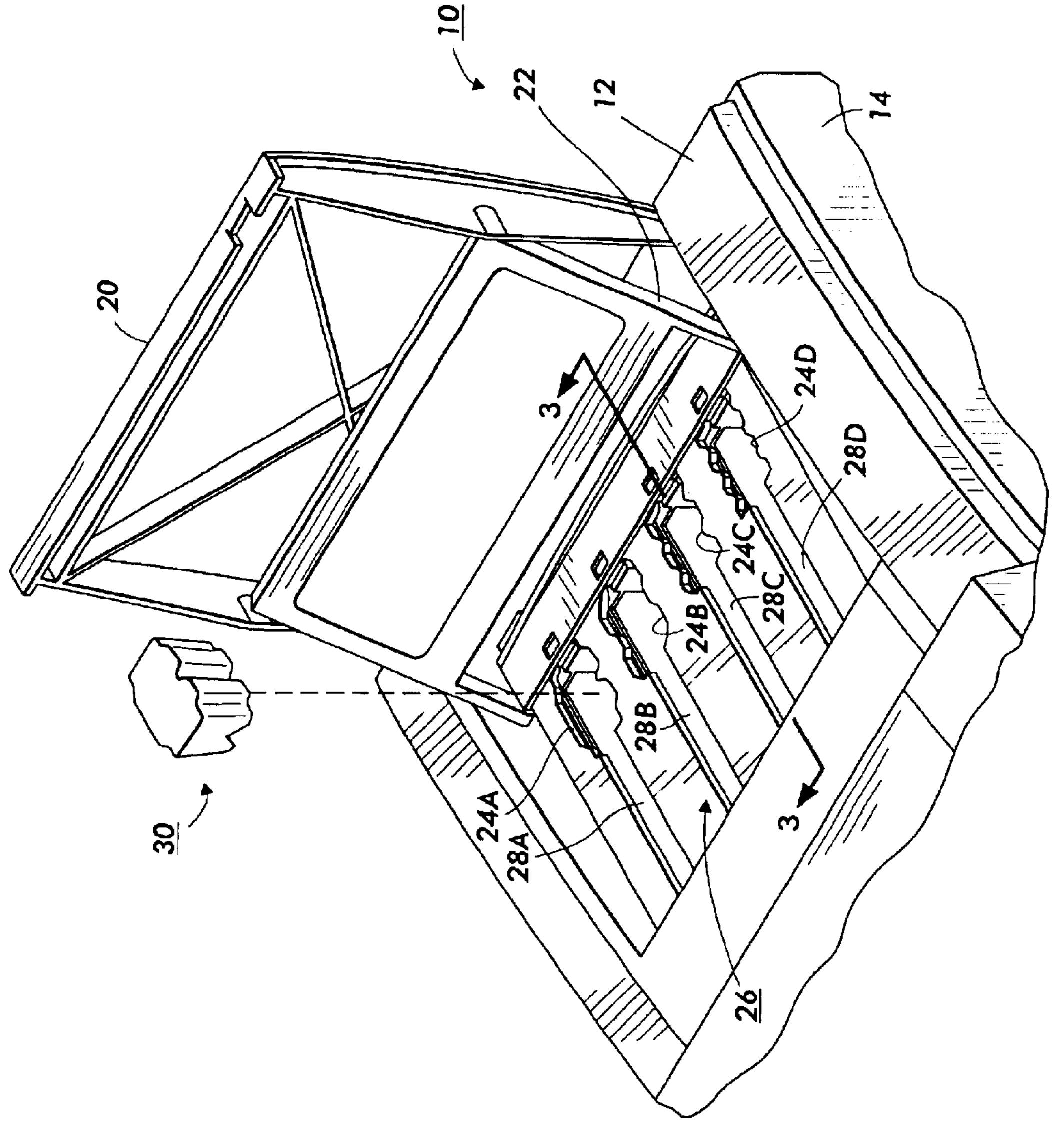
FIG. 2 is an enlarged partial top perspective view of the phase change printer with the ink access cover open, showing a solid ink stick in position to be loaded into a feed channel.

FIG. 1 shows a solid ink, or phase change, ink printer 10 that includes an outer housing having a top surface 12 and side surfaces 14. A user interface display, such as a front panel display screen 16, displays information concerning the status of the printer, and user instructions. Buttons 18 or other control elements for controlling operation of the printer are adjacent the user interface window, or may be at other locations on the printer. An ink jet printing mechanism (not shown) is contained inside the housing. Such a printing mechanism is described in U.S. Pat. No. 5,805,191, entitled Surface Application System, to Jones et al, and U.S. Pat. No. 5,455,604, entitled Ink Jet Printer Architecture and Method, to Adams et al. An ink feed system delivers ink to the printing mechanism. The ink feed system is contained under the top surface of the printer housing. The top surface of the housing includes a hinged ink access cover 20 that opens as shown in FIG. 2, to provide the user access to the ink feed system.

Figure 3:
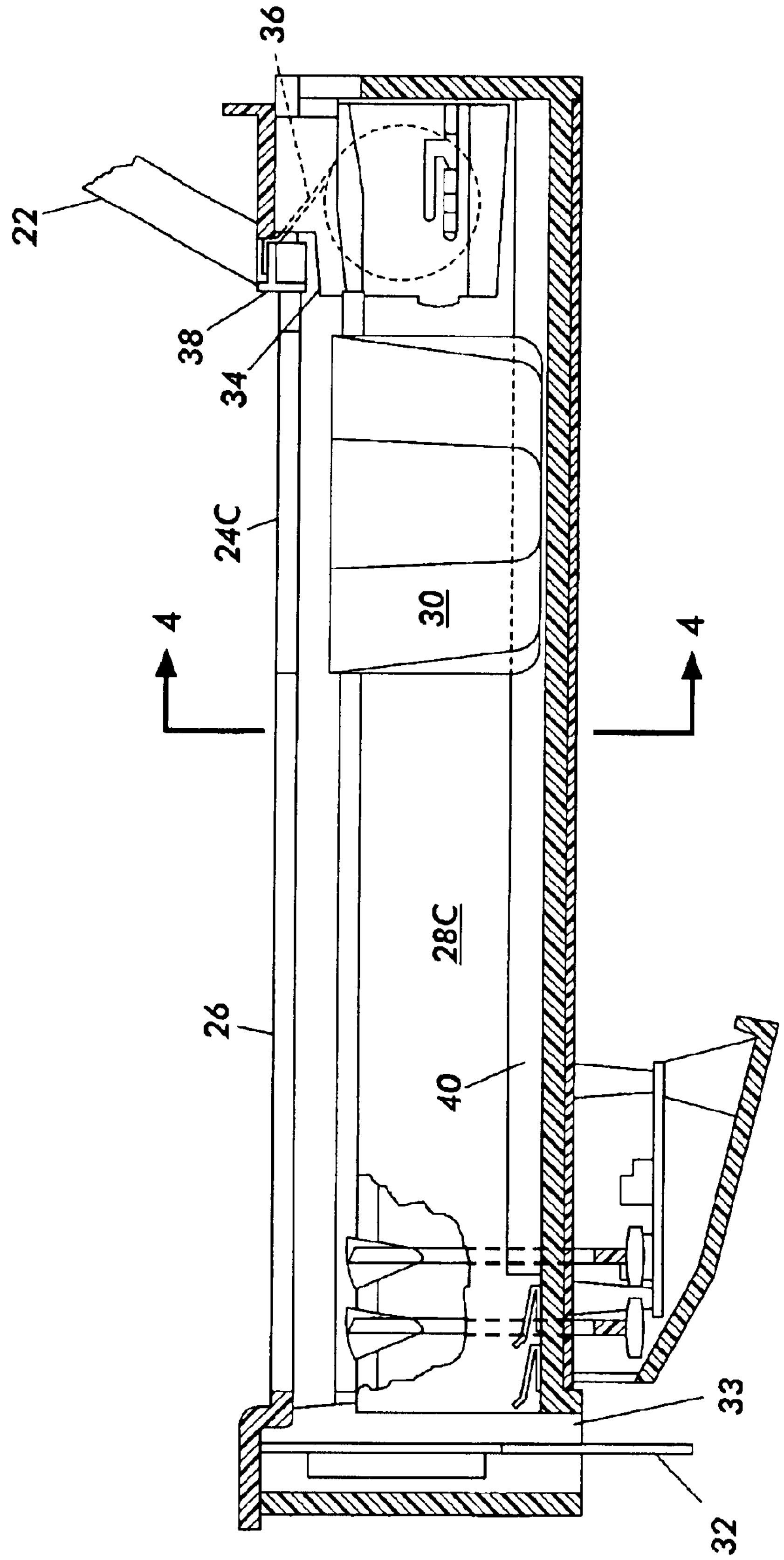
FIG. 3 is a side sectional view of a feed channel of a solid ink feed system taken along line 3—3 of FIG. 2.

In the particular printer shown, the ink access cover 20 is attached to an ink load linkage element 22 so that when the printer ink access cover 20 is raised, the ink load linkage 22 slides and pivots to an ink load position. The interaction of the ink access cover and the ink load linkage element is described in U.S. Pat. No. 5,861,903 for an Ink Feed System, issued Jan. 19, 1999 to Crawford et al., though with some differences noted below. As seen in FIG. 2, opening the ink access cover reveals a key plate 26 having keyed openings 24A–D. Each keyed opening 24A, 24B, 24C, 24D provides access to an insertion end of one of several individual feed channels 28A, 28B, 28C, 28D of the solid ink feed system (see FIGS. 2 and 3).

Each longitudinal feed channel 28A–D delivers ink sticks 30 of one particular color to a corresponding melt plate 32. Each feed channel has a longitudinal feed direction from the insertion end of the feed channel to the melt end of the feed channel. The melt end of the feed channel is adjacent the melt plate. The melt plate melts the solid ink stick into a liquid form. The melted ink drips through a gap 33 between the melt end of the feed channel and the melt plate, and into a liquid ink reservoir (not shown). The feed channels 28A–D have a longitudinal dimension from the insertion end to the melt end, and a lateral dimension, substantially perpendicular to the longitudinal dimension. Each feed channel in the particular embodiment illustrated includes a push block 34 driven by a driving force or element, such as a constant force spring 36, to push the individual ink sticks along the length of the longitudinal feed channel toward the melt plates 32 that are at the melt end of each feed channel. The tension of the constant force spring 36 drives the push block toward the melt end of the feed channel. As described in U.S. Pat. No. 5,861,903, the ink load linkage 22 is coupled to a yoke 38, which is attached to the constant force spring 36 mounted in the push block 34. The attachment to the ink load linkage 22 pulls the push block 34 toward the insertion end of the feed channel when the ink access cover is raised to reveal the key plate 26.

A color printer typically uses four colors of ink (yellow, cyan, magenta, and black). Ink sticks 30 of each color are delivered through a corresponding individual one of the feed channels 28A–D. The operator of the printer exercises cares to avoid inserting ink sticks of one color into a feed channel for a different color. Ink sticks may be so saturated with color dye that it may be difficult for a printer user to tell by color alone which color is which. Cyan, magenta, and black ink sticks in particular can be difficult to distinguish visually based on color appearance. The key plate 26 has keyed openings 24A, 24B, 24C, 24D to aid the printer user in ensuring that only ink sticks of the proper color are inserted into each feed channel. Each keyed opening 24A, 24B, 24C, 24D of the key plate has a unique shape. The ink sticks 30 of the color for that feed channel have a shape corresponding to the shape of the keyed opening. The keyed openings and corresponding ink stick shapes exclude from each ink feed channel ink sticks of all colors except the ink sticks of the proper color for that feed channel.

Figure 4:
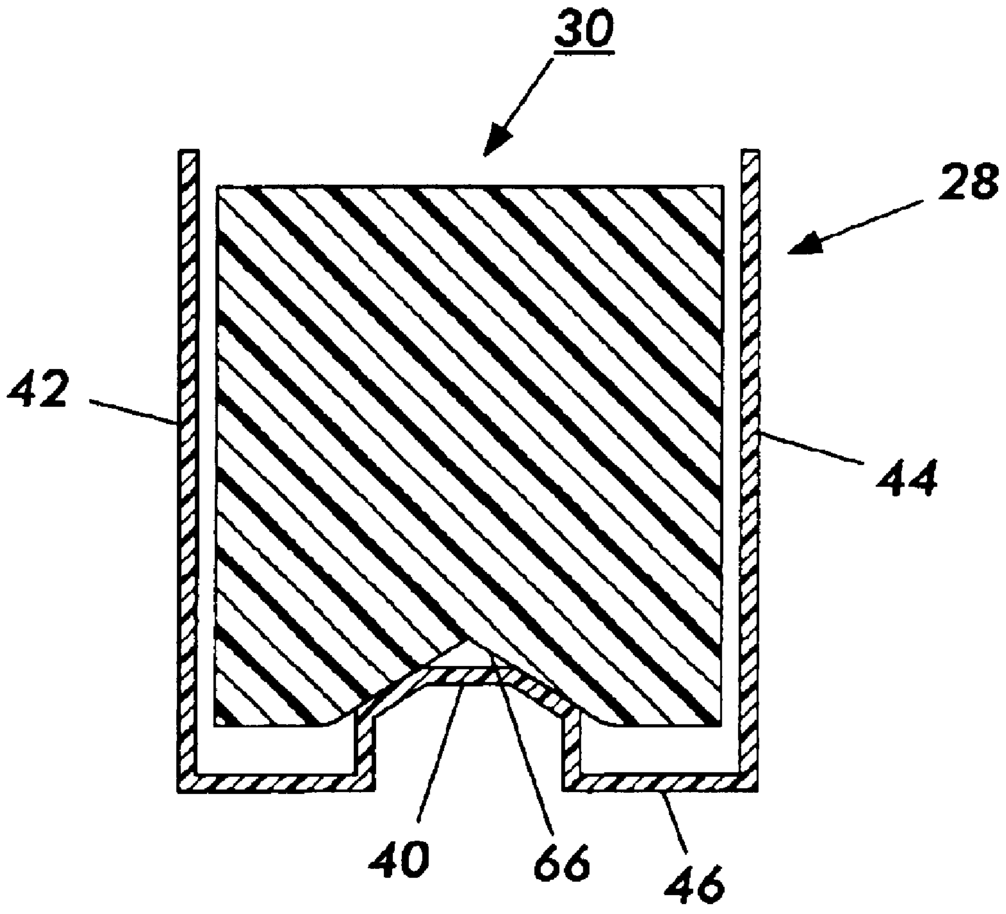
FIG. 4 is a simplified cross-sectional view of a feed channel taken along line 4—4 of FIG. 3.

Referring next to FIG. 4, the feed channel 28 is defined by lateral side walls 42, 44 that are substantially vertical, and a bottom 46. The transverse dimension is between the lateral side walls 42, 44. A longitudinal feed channel guide rail 40 is included in a lower portion of the feed channel, preferably near the bottom of the feed channel. This feed channel guide rail 40 is substantially centered in the lateral dimension in the feed channel, as shown in FIG. 4, so that it is aligned with the central longitudinal axis of the feed channel. The guide rail 40 is designed to receive the bottom surface of an ink stick. The exemplary feed channel guide rail illustrated is approximately the shape of an inverted "V" with a truncated peak, so that the width of the feed channel guide rail 40 at its peak is substantially less than the width of the feed channel between the side walls 42, 44.

Figure 5:
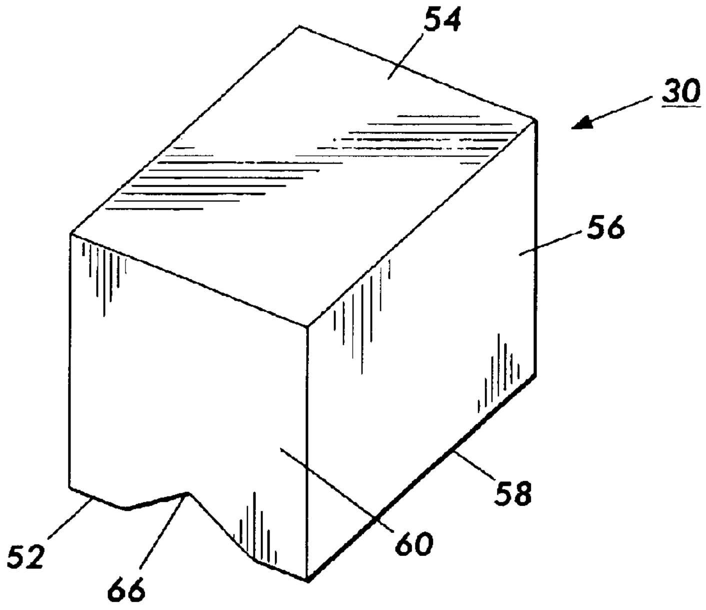
FIG. 5 is a perspective view of one embodiment of a solid ink stick.
Figure 6:
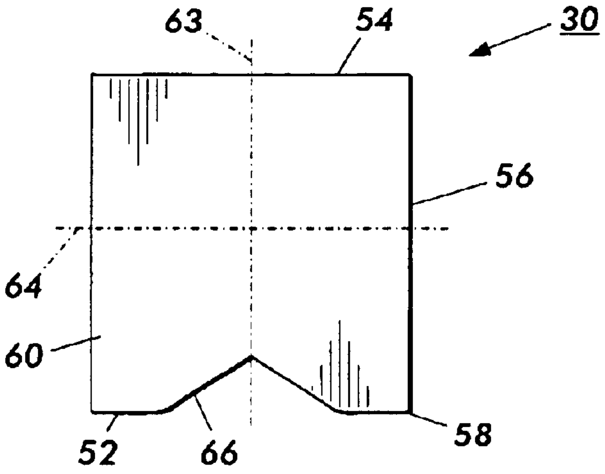
FIG. 6 is an end elevational view of the ink stick of FIG. 3.

An exemplary solid ink stick 30 for use in the feed channel with the feed channel guide rail is illustrated in FIGS. 5 and 6. The ink stick is formed of an ink stick body having a bottom, represented by a general bottom surface 52, a top, represented by a general top surface 54, and at least two lateral sides 56. The ink stick is illustrated without the key shapes on the lateral sides that correspond to the key plate openings 24A, 24B, 24C, 24D through the key plate 26, to simplify the illustration. The surfaces of the ink stick body need not be flat, nor need they be parallel or perpendicular one another. However, these descriptions will aid the reader in visualizing, even though the surfaces may have three dimensional topography, or be angled with respect to one another. The bottom of the ink stick body is a bottom surface having lateral edges 58 at which the bottom surface 52 intersects the lateral side surfaces 56. The ink stick body may be formed in a substantially rectangular block in which the lateral side surfaces 56 are substantially parallel one another. Such a rectangular block form of the ink stick body also includes two end surfaces 60 that are substantially parallel to one another, and are substantially perpendicular to the side surfaces 56. Nevertheless, other shapes of the side and end surfaces are also possible, including curved surfaces. As noted above, the side surfaces 56 may also be shaped with the key shapes to match the keyed openings through the key plate 26. The lateral side surfaces can also be segmented or stepped, so that one portion of the ink stick body is narrower than another. The ink stick body may be formed by pour molding, compression molding, or other forming techniques.

The ink stick body has a lateral center of gravity 63 between the lateral side surfaces 56 of the ink stick body, and a vertical center of gravity 63 between the top and bottom surfaces 52, 54. If the ink stick body has a substantially uniform weight density, the lateral center of gravity 63 is approximately midway between the lateral side surfaces 56 of the ink stick body. The lateral center of gravity 64 is identified in the ink stick body without the key shape elements that may be formed in the lateral side surfaces of the ink stick body.

Guide means including a longitudinal ink stick guide element 66 is formed in the lower portion of the ink stick body for guiding the ink stick 30 along the feed channel guide rail 40 in the feed channel 28. The longitudinal guide element 66 is formed in the bottom surface 52 of the ink stick body, and extends along the entire length of the body between the end surfaces 60. The longitudinal guide element 66 is symmetrical about the lateral center of gravity 63 of the ink stick body. In the ink stick embodiment illustrated in FIGS. 5 and 6, the bottom surface 52 of the ink stick body is formed in the shape of an inverted "V", with the peak approximately vertically aligned with the lateral center of gravity of the body to form the ink stick guide element 66. If the ink stick body has a substantially uniform weight density, the peak of the inverted V forming the guide element is substantially midway between the lateral edges 58 of the bottom surface of the ink stick body. Of course, inherent in many forming techniques is that the corners and edges may have radii, and not be square. In addition, in certain circumstances, radiused edges will be desired.

Referring again to FIG. 4, the slope of the "V" shape of the ink stick guide element 66 in the bottom surface of the ink stick body is substantially the same as the slope of the feed channel guide rail 40 in the ink feed channel. This common slope between the guide element surface 66 and the feed channel guide rail 40 allows a portion of the ink stick guide element to contact the feed channel guide rail to allow the feed channel guide rail to guide the ink stick along the feed channel, and help to hold the ink stick upright in the feed channel. The only contact between the bottom surface of the ink stick body and the longitudinal feed channel is the contact between the central guide element in the bottom surface of the ink stick body and the feed channel guide rail. The lateral side portions of the bottom surface of the ink stick body, adjacent the lateral edges 58 of the bottom surface 52 do not contact the bottom 46 of the feed channel 28. Such minimal contact between the bottom surface of the ink stick body and the feed channel guide rail minimizes the opportunity for chips or flakes of the ink material to interfere with the progress of the ink stick along the feed channel.

The lateral dimension of the ink stick body between the side surfaces 56 is no wider than the lateral dimension of the ink stick feed channel 28 between the side walls 42, 44. The lateral dimension of the ink stick body between the side surfaces 56 is substantially the same as the lateral dimension of the ink stick feed channel 28 between the side walls 42, 44, or more specifically only fractionally smaller than the lateral dimension of the ink stick feed channel 28 between the side walls 42, 44. For example, the ink stick body may have a longitudinal dimension (not including protruding insertion key or orientation elements) between the end surfaces 60 of between approximately 1.1 and 1.8 inches (28–46 mm), such as 1.5 inches (37 mm). The ink stick body may have a lateral dimension (not including protruding insertion key or orientation elements) between the lateral side surfaces 56 of between approximately 1.0 and 1.3 inches (25–33 mm), such as 1.3 inches (33 mm). The ink stick body may have a vertical dimension between the bottom and top surfaces 52, 54 of between approximately 1.0 and 1.5 inches (25–38 mm), such as 1.25 inches (32 mm). The lateral dimension of the ink stick feed channel 28 between the side walls 42, 44 may be approximately 0.004 to 0.08 inches (0.1–2.0 mm) wider than the lateral dimension of the ink stick body. Thus, the ink stick body 30 remains substantially upright and balanced with the central longitudinal guide element of the ink stick body resting on the feed channel guide rail of the feed channel. To the extent that the ink stick body tilts to one side or the other, one of the upper lateral edges of the ink stick body formed by the intersection of the lateral side surfaces 56 with the top surface 54 may contact a side wall 42, 44 of the feed channel. Thus, substantially the only contact between the bottom surface of the ink stick body and the feed channel is the contact between the longitudinal guide element 66 formed in the bottom surface of the ink stick body, and the guide rail 40 in the feed channel. Minor contact between an upper portion of the lateral side surface 56 of the ink stick body and the side of the feed channel 42, 44 may also occur.

The ink stick guide element 66 in the bottom surface of the ink stick body and the feed channel guide rail 40 in the feed channel cooperate to maintain the orientation of the ink stick as the ink stick progresses along the length of the feed channel from the insertion end to the melt end. The ink stick guide element 66 and the feed channel guide rail 40 forming the guide means keep the ink stick aligned with the feed channel. The ink stick body does not become skewed with respect to the feed channel. With the ink stick properly aligned with the feed channel, the ink stick meets the melt plate 32 normal to the melt plate surface. Proper alignment between the ink stick and the melt plate enhances even melting of the ink stick. Even melting reduces the formation of unmelted corner slivers at the trailing end of each ink stick. Such unmelted corner slivers may slip through the gap 33 between the melt plate and the end of the feed channel. Such slivers may interfere with the proper functioning of certain portions of the printer. Guiding the ink stick to maintain its alignment the feed channel also prevents jamming due to showing of the ink stick as it moves along the channel.

Key element shapes in the lateral side surfaces 56 of the ink stick body may tend to affect the orientation of the ink stick body as the ink stick moves along the feed channel. The interaction of the guide element 66 and the guide rail 40 counteracts that tendency, and maintains the correct orientation of the ink stick in the feed channel. The cooperative action of the ink stick guide element 66 and the feed channel guide rail 40 also reduce the "steering" effect the push block 34 acting on the trailing end surface of the ink stick in the feed channel 28. Thus, laterally offset pressure by the push block 34 on the ink stick body is of lesser concern, and maintaining a perfect lateral balance of the force exerted by the push block on the ink stick is less critical than with certain other designs.

As seen in FIGS. 5 and 6, the inverted "V" shape of the ink stick guide element 66 need not necessarily extend all of the way to the lateral edges 58 of the bottom surface of the ink stick body. The outer lateral portions of the bottom surface may be substantially flat, parallel to the top surface 54 of the ink stick body. Various alternative shapes for the bottom surface of the ink stick body can be implemented. Also, radius edges and corners can also be included in the ink stick body.

Figure 7:
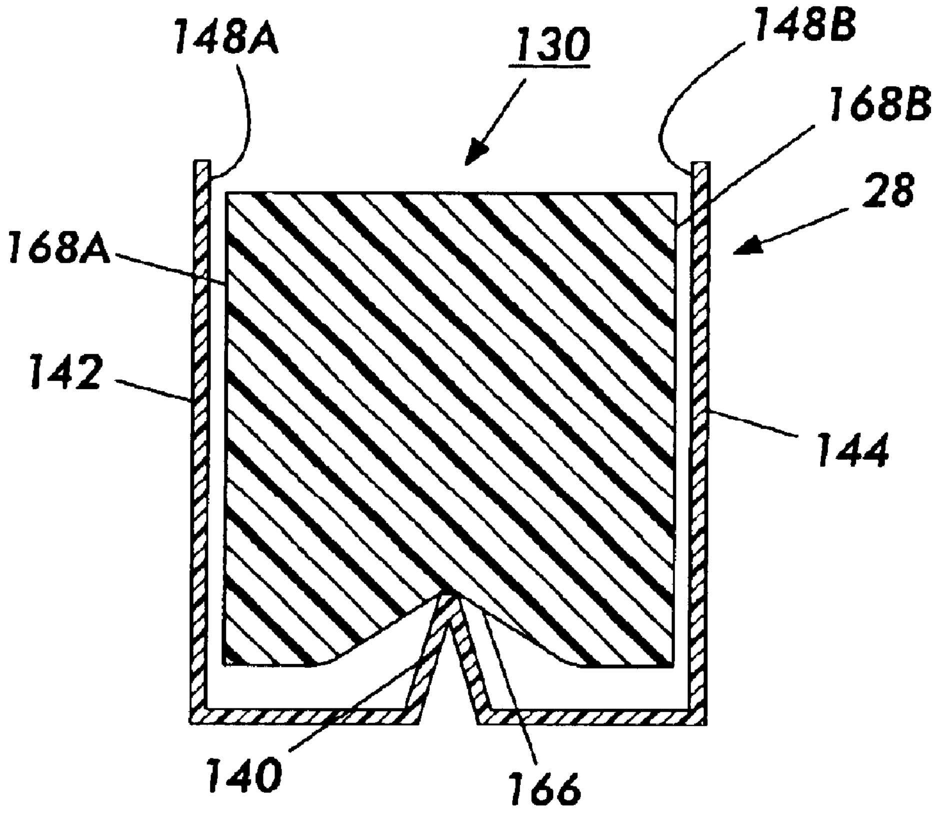
FIG. 7 is a simplified cross-sectional view of an alternate feed channel.

FIG. 7 illustrates an embodiment in which the slope of the feed channel guide rail 140 is substantially steeper than the slope of the ink stick guide element 166 of the ink stick 130. This embodiment provides particularly minimal contact between the bottom of the ink stick and the feed channel surfaces, minimizing the effects of friction between them. In this embodiment, the side walls 142, 144 of the feed channel help to guide the ink stick along the feed channel, as the ink stick may tend to tilt to one side or the other of contact between the feed channel guide rail 140 and the ink stick guide element 166. The upper portions of the side walls 142, 144 of the feed channel form a second feed channel guide rail 148A, 148B that slidingly engage a second guide element 168A, 168B formed on the upper portion of the lateral side surfaces of the ink stick.

Figure 8:
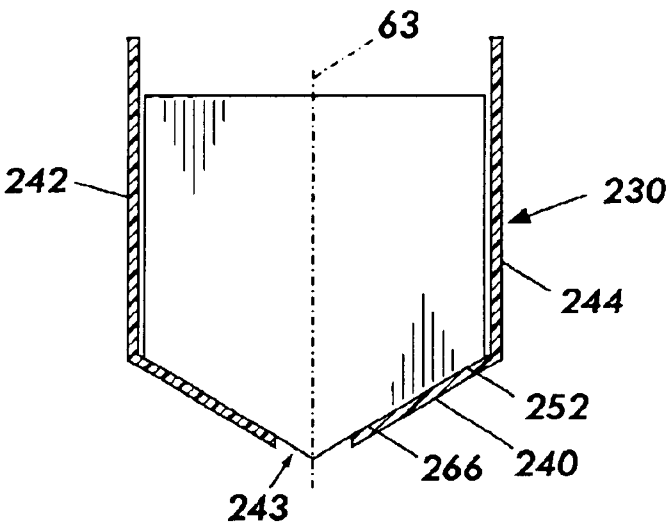
FIG. 8 is a simplified cross-sectional view of another alternate feed channel.
Figure 9:
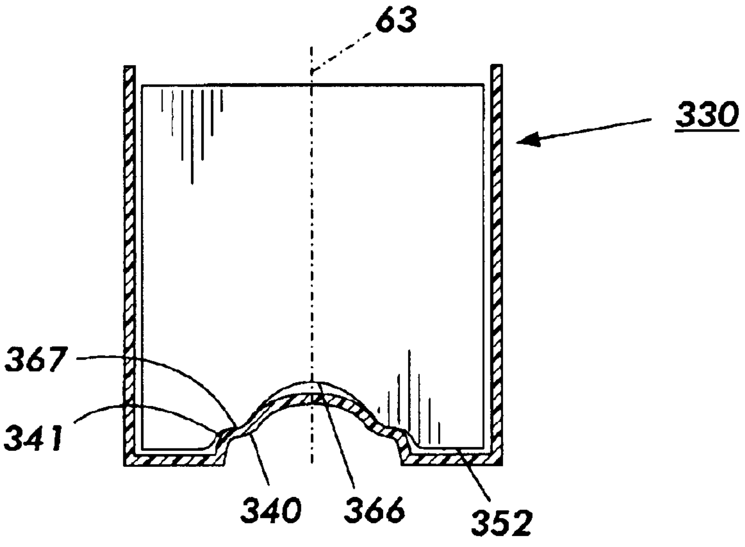
FIG. 9 is a simplified cross-sectional view of yet another alternate feed channel.
Figure 10:
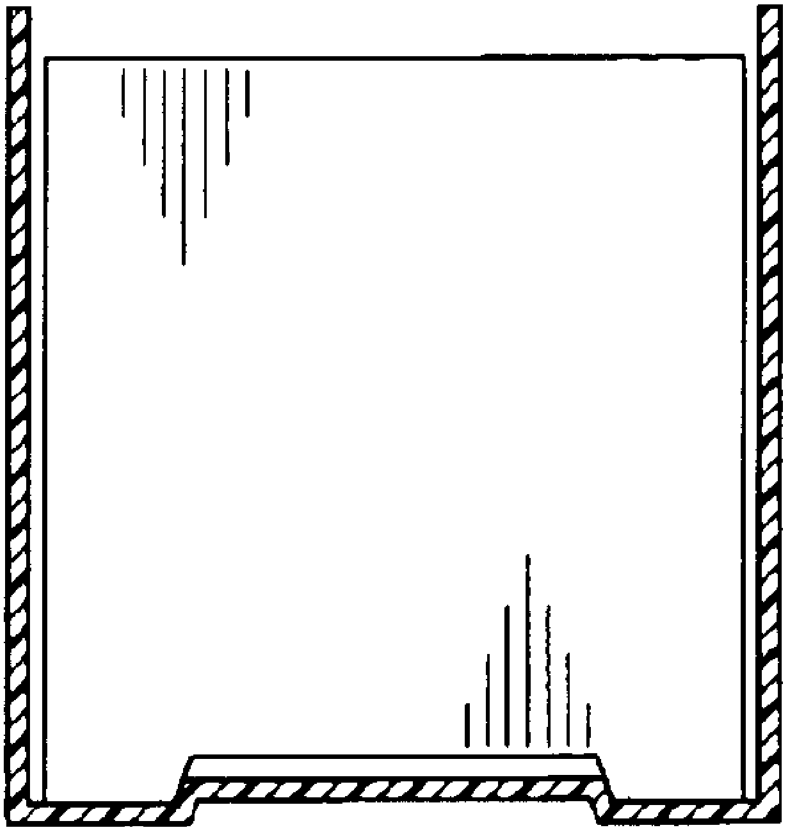
FIG. 10 is a simplified cross-sectional view of yet another alternate feed channel.

Three additional exemplary embodiments are shown in FIGS. 8–10. The ink stick body embodiment 230 shown in FIG. 8 has a bottom surface 252 with an ink stick guide element 266 formed as a non-inverted, or projecting, "V" shape. The bottom surface of the feed channel has a corresponding shape to form the feed channel guide rail 240. In the illustrated embodiment, the feed channel guide rail 240 is formed as two angled channel segments that extend from the side walls 242, 244 toward the center of the feed channel. The angle of the feed channel guide rail 240 substantially matches the angle of the guide element 266. The feed channel guide rail 240 does not extend across the entire width of the feed channel, providing an opening 243 in the bottom of the feed channel. The bottom opening 243 allows chips and slivers of ink material that break off from the ink stick to fall away, so that they do not interfere with movement of the ink stick along the feed channel.

The ink stick 330 shown in FIG. 9 includes a guide element 366 formed as a concave shape in the bottom 352 of the ink stick body. The concave ink stick guide element 366 cooperates with the feed channel guide rail 340. The feed channel guide rail 340 and the ink stick guide element 366 have alignment guides 341, 367 to avoid a tendency of the ink stick to rotate about the feed channel guide rail 340 and tilt in the feed channel. The alignment guides illustrated are a longitudinal ridge 341 along the feed channel guide rail 340, and a corresponding longitudinal notch along the ink stick guide element 366. The guide element can also be formed of a convex shape in the bottom of the ink stick body.

FIG. 10 shown an ink stick with the outer portion of an ink stick bottom in contact with, and resting on, the feed channel support in the feed channel. The ink stick is guided in the lateral direction by a centrally located raised guide element in the feed channel. The majority of the bottom surface of the ink stick is not in contact with the bottom surface of the feed channel.

In accordance with a method of using the ink stick and ink feed system shown, the printer user provides an ink stick such as the ink stick shown in FIGS. 4–6, or the alternative embodiments shown in FIGS. 7–9. The user opens the printer cover 20, which in turn pivots and slides the ink load linkage 22, as seen in FIG. 2. The user inserts the ink stick 30 through the keyed opening 24A, 24B, 24C, 24D in the key plate 26 and into the corresponding feed channel 28A, 28B, 28C, 28D. The user inserts the ink stick so that the ink stick guide element 66 formed in the bottom surface of the ink stick body is aligned with the feed channel guide rail 40 in the feed system. The user places the ink stick body in the insertion end of the feed channel so that the ink stick guide element 66 rests on the feed channel guide rail 40. In this way, substantially the only contact between the bottom surface of the ink stick and the feed system is the contact between the guide element in the ink stick body and the feed channel guide rail of the feed channel. The user then closes the printer cover 20. The push block 34 pushes the ink stick along the feed channel 28 toward the melt plate 32, with the ink stick guide element 66 sliding along the feed channel guide rail 40 of the feed channel.

Those skilled in the art will recognize that corners and edges may have radii or other non-sharp configurations, depending on various factors, including manufacturing considerations. Numerous modifications can be made to the specific embodiments described above. Those skilled in the art will recognize that the guide element in the bottom surface of the ink stick body, and the guide rail in the bottom of the feed channel may have numerous shapes other than the particular shapes illustrated. In addition, numerous other configurations of the feed channel, key plate, and other components of the ink feed system can be constructed within the scope of the invention. Therefore, the following claims are not to be limited to the specific embodiments illustrated and described above.

I claim:

1. A solid ink feed system for a phase change ink jet printer, the feed system comprising:

a longitudinal feed channel;

a longitudinal feed channel guide rail substantially centered in a lower portion of the feed channel; and an ink stick having at least a bottom surface;

wherein:

the ink stick has a width substantially equal to the width of the feed channel;

the ink stick has a longitudinal ink stick guide element substantially centered in the bottom surface of the ink stick;

the width of the feed channel guide rail is substantially less than the width of the feed channel; and the shape of the ink stick guide element and the shape of the feed channel guide rail substantially complement one another so that when the ink stick is placed in the solid ink feed system, contact between the feed channel guide rail and the ink stick guide element forms a load-bearing support contact.

2. The solid ink feed system of claim 1, wherein:

the feed channel guide rail has an inverted "V" shaped cross section; and the bottom surface of the ink stick has an inverted "V" shape forming the ink stick guide element.

3. A method of loading an ink stick into a solid ink feed system of a phase change ink jet printer, the method comprising:

providing an ink stick, wherein the ink stick includes:

a bottom surface;

a lateral center of gravity; and an ink stick guide element in the bottom surface, substantially aligned with the lateral center of gravity;

aligning the ink stick guide element with a feed channel guide rail in the feed system;

inserting the ink stick into the feed system; and resting the ink stick guide element on the feed channel guide rail so that contact between the ink stick guide element and the feed channel guide rail is a load-bearing contact between the ink stick and the feed system.

4. The method of claim 3, wherein upon resting the ink stick guide element on the feed channel guide rail, the contact between the ink stick guide element and the feed channel guide rail is substantially the only contact between the bottom surface of the ink stick and the feed system.

5. An ink stick for use in a solid ink feed system of a phase change ink jet printer, the ink stick comprising:

a body having a lower portion and at least two sides; and a longitudinal ink stick guide element formed in the lower portion of the body;

wherein the longitudinal ink stick guide element is substantially centrally positioned between the sides of the body; and wherein the ink slick body is adapted so that when the ink stick is inserted into the solid ink feed system, the longitudinal ink stick guide element forms a load-bearing contact with the solid ink feed system.

6. The ink stick of claim 5, wherein:

the lower portion of the body includes a bottom; and the longitudinal ink stick guide element is formed in the bottom.

7. The ink stick of claim 6, wherein:

the bottom of the body comprises a bottom surface; and the at least two sides of the body comprise opposed side surfaces.

8. The ink stick of claim 7, wherein:

each of the two side surfaces intersect the bottom surface to form two lateral edges on the bottom surface; and the ink stick guide element is substantially centrally positioned between the lateral edges.

9. The ink stick of claim 5, wherein the ink stick guide element is a recess.

10. The ink stick of claim 9, wherein the bottom surface of the ink stick body slopes upward from near the lateral edges to the recess.

11. The ink stick of claim 5, wherein the ink stick guide element is a protrusion.

12. The ink stick of claim 11, wherein the bottom surface of the ink stick body slopes downward from near the lateral edges to the protrusion.

13. The ink stick of claim 5, wherein the body has a length, and the ink stick guide element extends along the length of the body.

14. The ink stick of claim 5, wherein:

the bottom surface has a front edge and a rear edge; and the ink stick guide element extends from the front edge to the rear edge.

* * * * *